United States Patent
Oku et al.

(10) Patent No.: US 11,828,391 B2
(45) Date of Patent: Nov. 28, 2023

(54) THREADED CONNECTION

(71) Applicants: NIPPON STEEL CORPORATION, Tokyo (JP); VALLOUREC OIL AND GAS FRANCE, Aulnoye-Aymeries (FR)

(72) Inventors: Yousuke Oku, Tokyo (JP); Satoshi Maruta, Tokyo (JP); Masaaki Sugino, Tokyo (JP); Alan Fothergill, Houston, TX (US)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 20 days.

(21) Appl. No.: 17/596,391

(22) PCT Filed: Aug. 20, 2020

(86) PCT No.: PCT/JP2020/031453
§ 371 (c)(1),
(2) Date: Dec. 9, 2021

(87) PCT Pub. No.: WO2021/059807
PCT Pub. Date: Apr. 1, 2021

(65) Prior Publication Data
US 2022/0163143 A1 May 26, 2022

(30) Foreign Application Priority Data

Sep. 24, 2019 (JP) .................................. 2019-172936

(51) Int. Cl.
*F16L 15/00* (2006.01)
*E21B 17/042* (2006.01)

(52) U.S. Cl.
CPC .......... *F16L 15/007* (2013.01); *E21B 17/042* (2013.01)

(58) Field of Classification Search
CPC ....... F16L 15/002; F16L 15/007; F16L 15/04; E21B 17/0423; E21B 17/042
See application file for complete search history.

(56) References Cited

U.S. PATENT DOCUMENTS

| 4,676,529 A | 6/1987 | Mcdonald |
| 5,462,315 A | 10/1995 | Klementich |

(Continued)

FOREIGN PATENT DOCUMENTS

| EP | 4012239 A1 | 6/2022 |
| JP | 07504483 A | 5/1995 |

(Continued)

*Primary Examiner* — David Bochna
(74) *Attorney, Agent, or Firm* — Greer Burns & Crain Ltd.

(57) ABSTRACT

In a threaded connection of a two-step thread construction including intermediate shoulder surfaces, a break is prevented near the intermediate critical cross sections upon application of a tensile load, and the intermediate shoulder surfaces are easier to create, thus improving productivity. The outer periphery portion of a pin located between an intermediate shoulder surface of the pin and a second male thread is provided with a circumferential groove including a curved surface smoothly contiguous to the intermediate shoulder surface, thereby mitigating plastic strains generated near the pin intermediate critical cross section PICCS. The inner periphery portion of a box located between an intermediate shoulder surface of the box and a first female thread is provided with a circumferential groove including a curved surface smoothly contiguous to the intermediate shoulder surface, thereby mitigating plastic strains generated near a box intermediate critical cross section BICCS.

10 Claims, 8 Drawing Sheets

(56) References Cited

U.S. PATENT DOCUMENTS

| | | | |
|---|---|---|---|
| 6,530,607 | B1 | 3/2003 | Mallis et al. |
| 6,550,821 | B2 | 4/2003 | Delange et al. |
| 6,581,980 | B1 * | 6/2003 | DeLange ............ E21B 17/0423 |
| | | | 285/333 |
| 7,066,499 | B2 * | 6/2006 | Della Pina .............. F16L 15/04 |
| | | | 285/334 |
| 9,863,560 | B2 | 1/2018 | Durivault et al. |
| 10,145,495 | B2 | 12/2018 | Elder et al. |
| 2004/0021314 | A1 | 2/2004 | Pina et al. |
| 2022/0259927 | A1 * | 8/2022 | Foulogne .............. F16L 15/002 |
| 2022/0260186 | A1 * | 8/2022 | Foulogne ............ E21B 17/0423 |

FOREIGN PATENT DOCUMENTS

| | | | |
|---|---|---|---|
| JP | 2002357287 | A | 12/2002 |
| JP | 2004504563 | A | 2/2004 |
| JP | 2012510009 | A | 4/2012 |
| JP | 2013519854 | A | 5/2013 |
| JP | 2013536339 | A | 9/2013 |
| WO | 2010059145 | A1 | 5/2010 |
| WO | 2017145192 | A1 | 8/2017 |
| WO | 2021013646 | A1 | 1/2021 |

* cited by examiner

THREADED CONNECTION

TECHNICAL FIELD

The present disclosure relates to a threaded connection used to connect steel pipes.

BACKGROUND ART

Mining of underground resources in oil wells, natural-gas wells, etc. (hereinafter collectively referred to as "oil wells" or the like) involves the use of casing that forms multi-layer well walls or tubing positioned within the casing to produce oil or gas. Such casing or tubing is constructed by connecting a large number of steel pipes in series using a threaded connection. A steel pipe used in an oil well is sometimes referred to as oil-well pipe.

Threaded connections are generally categorized as integral type and coupling type.

An integral connection directly connects steel pipes. Specifically, a female thread is provided on one end of each oil-well pipe, while a male thread is provided on the other end of each oil-well pipe; into the female thread on one oil-well pipe is screwed the male thread on another oil-well pipe, such that these oil-well pipes are connected.

In the case of a coupling-type connection, oil-well pipes are connected using a tubular coupling. Specifically, a female thread is provided on each of the ends of the coupling, while a male thread is provided on each of the ends of each oil-well pipe. Then, one male thread on one oil-well pipe is screwed into one female thread on the coupling and one male thread on another oil-well pipe is screwed into the other female thread of the coupling, such that these oil-well pipes are connected. That is, a coupling-type connection connects a pair of pipes, one of which is an oil-well pipe while the other one is a coupling.

An end of an oil-well pipe on which a male thread is provided includes an element to be inserted into a female thread provided on an oil-well pipe or a coupling, and thus is usually referred to as pin. An end of an oil-well pipe or coupling on which a female thread is provided includes an element for receiving a male thread provided on an oil-well pipe, and thus is referred to as box.

In recent years, there have been trends to drill still deeper wells at higher temperatures and higher pressures. In deep wells, where complexities of formation-pressure distribution with depth necessitate increased casing layers, slim-type threaded connections are sometimes used, whose maximum outer diameter at joint, i.e. box outer diameter, is substantially equal to the outer diameter of the pipe body of the oil-well pipe. A threaded connection with a box outer diameter substantially equal to the outer diameter of the pipe body of the oil-well pipe is often referred to as flush-type threaded connection. A threaded connection with a box outer diameter smaller than about 108% of the outer diameter of the pipe body of the oil-well pipe is often referred to as semi-flush-type threaded connection. Such flush-type and semi-flush-type threaded connections are not only required to have high strength and sealability, but are also subject to tight size restrictions for their various portions to allow their thread and seal structures to be positioned in a limited pipe-wall thickness.

In flush-type and semi-flush-type threaded connections with tight size restrictions, a connection design is often used that has male and female threads constituted by two-step threads with threaded portions positioned forward and rearward of intermediate shoulder surfaces provided at the middle of the connection as determined along the axial direction. Threaded connections of such two-step thread constructions are disclosed, for example, in Patent Documents 1 and 2 listed below. Further, threaded connections of two-step thread constructions in which intermediate shoulder surfaces are replaced by hook-type intermediate shoulder constructions with shoulders that fit each other are disclosed, for example, in Patent Documents 3 and 4 listed below.

In such threaded connections with two-step thread constructions, critical cross sections (PICCS and BICCS) are present at the middle of the connection, as discussed in Patent Document 1.

A critical cross section (CCS) is that transverse section of the connection which has the smallest area for resisting tensile loads when the connection is made up. When an excessive axial tensile load is applied, a break is likely to occur at or near the critical cross section.

In a typical threaded connection of a single-step thread construction, transmission of a tensile load from the pin to the box occurs in an axially dispersed pattern across the entire region of thread engagement. Thus, cross sections of the pin on which the entire tensile load acts are located further toward the pipe body of the pin than the region of engagement, while cross sections of the box on which the entire tensile load acts are located further toward the pipe body of the box than the region of thread engagement. The cross section on which the entire tensile load acts and which has the smallest area is a critical cross section. That is, when the connection is made up, that transverse section of the box which contains that thread root of the female thread which corresponds to that end of the engagement between the male and female threads which is closer to the tip of the male thread represents a box critical cross section (BCCS). Further, when the connection is made up, that transverse section of the pin which contains that thread root of the male thread which corresponds to that end of the engagement between the male and female threads which is closer to the pipe body of the male thread represents the pin critical cross section (PCCS). The smaller one of the areas of the box and pin critical cross sections represents the critical cross section (CCS) of the threaded connection. The ratio of the area of the critical cross section to the cross-sectional area of the pipe body of the oil-well pipe is called joint efficiency, which is widely used as an indicator of the tensile strength of the connection relative to the tensile strength of the body of the oil-well pipe.

Such box and pin critical cross sections are also present in a threaded connection of a two-step thread construction. Further, as discussed above, a threaded connection of a two-step thread construction has positions with small connection cross-sectional areas for resisting tensile loads, these positions being at the axial middle of the connection. That is, a threaded connection of a two-step thread construction has a section with no thread engagement at the axial middle. In this section with no thread engagement, a tensile load jointly borne by the pin and the box is axially transmitted without an increase or decrease.

As such, that cross section of the pin within the section with no thread engagement which has the smallest area represents the pin intermediate critical cross section (PICCS), while that cross section of the box within the section with no thread engagement which has the smallest area represents the box intermediate critical cross section (BICCS). To prevent a break in middle portions of the connection, it is preferable to maximize the total area of the pin and the box intermediate critical cross sections._

PRIOR ART DOCUMENTS

Patent Documents

[Patent Document 1] JP 2013-536339 A
[Patent Document 2] JP 2002-357287 A
[Patent Document 3] JP Hei7-504483 A
[Patent Document 4] JP 2013-519854 A

SUMMARY OF THE INVENTION

Problems to be Solved by the Invention

However, in a threaded connection of a two-step thread construction, intermediate shoulder surfaces are provided in the section with no thread engagement. To improve torque resistance, it is necessary to ensure a certain radial dimension of the intermediate shoulder surfaces to provide a large contact area between the intermediate shoulder surfaces. As a result, it is difficult to ensure that the pin and the box intermediate critical cross sections in flush-type and semi-flush-type threaded connections of two-step thread constructions have large cross-sectional areas.

The pin and the box intermediate critical cross sections are located near the intermediate shoulder surfaces. As measured along each of the pin and the box, the cross-sectional area rapidly changes at the intermediate shoulder surfaces; as such, the pin and the box intermediate critical cross sections, which are present nearby, can easily develop large strains.

In conventional threaded connections, the diameter of the chamfered portion at the bottom of each intermediate shoulder surface is minimized, as shown by Patent Documents 1 and 2, to ensure a certain area of contact between the intermediate shoulder surfaces and to ensure a certain pipe-wall thickness at and near the intermediate shoulder surfaces. As a result, the process for creating the intermediate shoulder surfaces is difficult.

Patent Document 2 discloses a threaded connection having annular reliefs that provide flexibility toward expansion or bending of the thread joint. These annular reliefs are constituted by annular grooves provided on the outer periphery of the pin and the inner periphery of the box, located near the intermediate shoulders. These annular grooves are spaced apart from the intermediate shoulder surfaces, and do not affect the ability to create the intermediate shoulders. Patent Document 2 is also silent on breaks at the intermediate critical cross sections during application of tensile loading.

The hook-shaped intermediate shoulder structures disclosed by Patent Documents 3 and 4 have complicated constructions, which are even more difficult to create.

An object of the present disclosure is to provide a threaded connection of a two-step thread construction including intermediate shoulder surfaces, where a break is prevented at or near the pin and/or box intermediate critical cross sections upon application of a tensile load and the intermediate shoulder surfaces are easier to create, thus improving productivity.

Means for Solving the Problems

A threaded connection according to the present disclosure includes a tubular pin and a tubular box, the pin and the box being made up as the pin is screwed into the box. On an outer periphery of the pin are provided: a first male thread; a second male thread spaced apart from the first male thread and located further toward a tip as determined along an axial direction, the second male thread having a smaller diameter than the first male thread; an intermediate shoulder surface constituted by a stepped portion located between the first male thread and the second male thread; and a first peripheral surface constituted by an outer periphery portion of the pin located between the intermediate shoulder surface and the second male thread. On an inner periphery of the box are provided: a first female thread engaged by the first male thread when the connection is made up; a second female thread engaged by the second male thread when the connection is made up; an intermediate shoulder surface constituted by a stepped portion located between the first female thread and the second female thread, the intermediate shoulder surface being in contact with the intermediate shoulder surface of the pin when the connection is made up; and a second peripheral surface constituted by an inner periphery portion of the box located between the intermediate shoulder surface and the first female thread. A first circumferential groove is provided on one of the first peripheral surface and the second peripheral surface, the first circumferential groove having a curved surface smoothly contiguous to the intermediate shoulder surface associated with the peripheral surface, the curved surface being at least a portion of an in-groove surface of the first circumferential groove.

Effects of the Invention

The present disclosure provides a threaded connection of a two-step thread construction including intermediate shoulder surfaces, where a break is prevented at or near the pin or box intermediate critical cross section upon application of a tensile load and the intermediate shoulder surfaces are easier to create, thus improving productivity.

EMBODIMENTS FOR CARRYING OUT THE INVENTION

Figure 1:
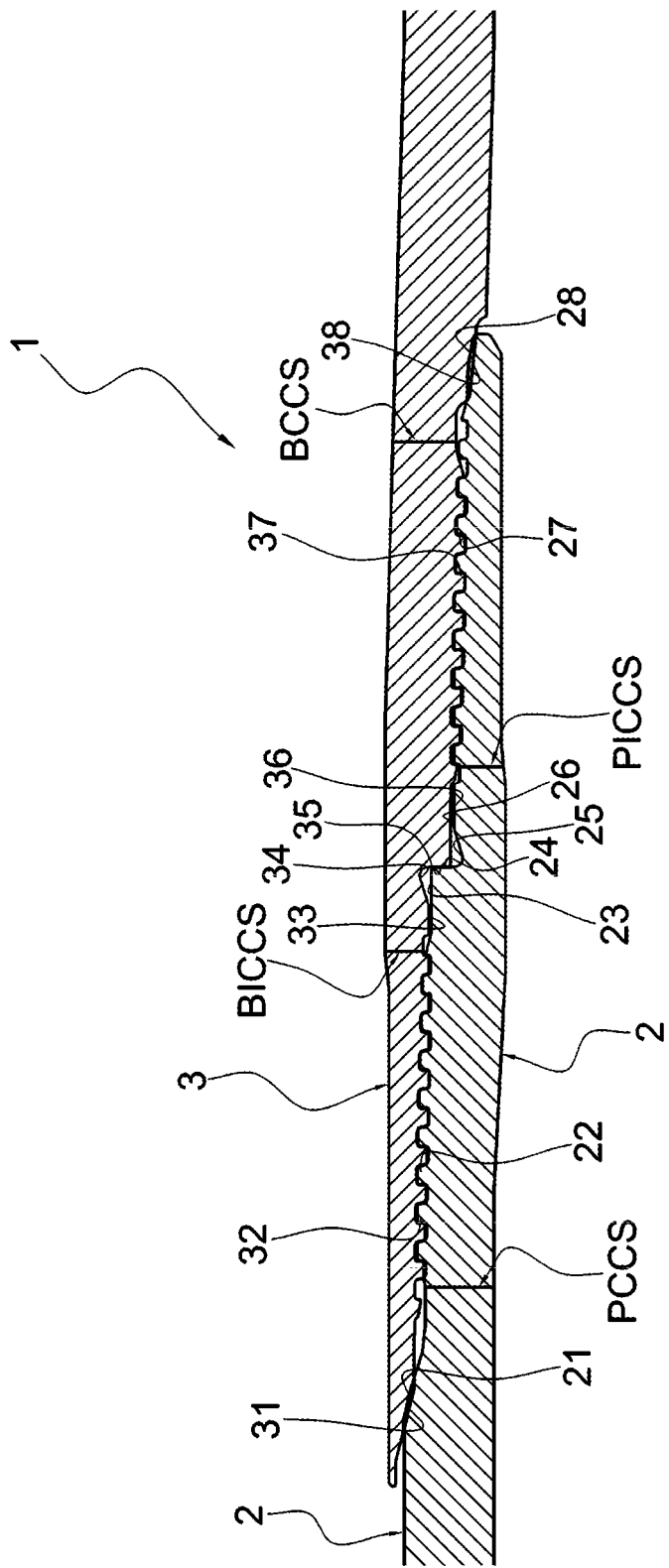
FIG. 1 is a longitudinal cross-sectional view of a threaded connection for steel pipe according to an embodiment as made up.

A threaded connection according to the present embodiment includes a tubular pin and a tubular box. The pin and the box are made up as the pin is screwed into the box. The pin may be provided on an end of a steel pipe, such as an oil-well pipe. The box may be provided on an end of a coupling or on an end of another steel pipe. The oil-well pipe or coupling may be made of a metal, such as stainless steel or nickel-base alloy.

On the outer periphery of the pin are provided: a first male thread; a second male thread spaced apart from the first male thread and located further toward the tip as determined along the axial direction, the second male thread having a smaller diameter than the first male thread; an intermediate shoulder surface constituted by a stepped portion located between the first male thread and the second male thread; and a first peripheral surface constituted by an outer periphery portion of the pin located between the intermediate shoulder surface and the second male thread. The intermediate shoulder surface may be constituted by the side of the stepped portion (i.e., end surface facing toward the tip as determined along the axial direction). The first and second male threads may each be constituted by a tapered thread with a diameter gradually decreasing toward the tip of the pin as determined along the axial direction. In such implementations, the second male thread having a smaller diameter than the first male thread means that the diameter of the second male thread's portion toward the basement is smaller than the diameter of the first male thread's portion toward the tip.

Further, a pin outer sealing surface may be provided on the outer periphery of the pin, located further toward the basement than the first male thread, while a pin inner sealing surface may be provided on the outer periphery of the pin, located further toward the tip than the second male thread. A pin intermediate sealing surface may be provided on the outer periphery of the pin, located between the intermediate shoulder surface and first male thread or between the intermediate shoulder surface and second male thread. One or more such sealing surfaces may be provided, depending on the required sealability and/or connection construction.

On the inner periphery of the box are provided: a first female thread engaged by the first male thread when the connection is made up; a second female thread engaged by the second male thread when the connection is made up; an intermediate shoulder surface constituted by a stepped portion located between the first female thread and the second female thread; and a second peripheral surface constituted by an inner periphery portion of the box located between the intermediate shoulder surface and the first female thread. The intermediate shoulder surface of the box may be constituted by the side surface of the stepped portion. The intermediate shoulder surface of the box is in contact with the intermediate shoulder surface of the pin when the connection is made up. The first and second female threads may have thread profiles complementary with the thread profiles of the first and second male threads, respectively, and may each be constituted by a tapered thread with a diameter gradually decreasing toward the tip of the box as determined along the axial direction (i.e. toward the basement of the pin as determined along the axial direction).

The male and female threads may each be a buttress thread, or a wedge thread with a longitudinal cross section that is dovetailed and with a thread width gradually decreasing toward the tip along the helix of the thread, or any other suitable thread.

A sealing surface may also be provided on the inner periphery of the box that corresponds to a sealing surface provided on the pin outer periphery. That is, in implementations where a pin outer sealing surface is provided, a box outer sealing surface may be provided that is in contact with the pin outer sealing surface when the connection is made up. In implementations where a pin inner sealing surface is provided, a box inner sealing surface may be provided that is in contact with the pin inner sealing surface when the connection is made up. In implementations where a pin intermediate sealing surface is provided, a box intermediate sealing surface may be provided that is in contact with the pin intermediate sealing surface when the connection is made up. For each pair of sealing surfaces in contact with each other, a predetermined amount of radial interference is set between the sealing surfaces such that, when fitted together, each sealing surface having a force of elastic recovery, through which tries to recover its original diameter. The force of elastic recovery causes a tight contact along the entire circumference, thereby exhibiting sealability.

Each of the intermediate shoulder surfaces of the pin and the box may be a flat surface perpendicular to the pipe axis, or may be a tapered surface having a taper generatrix slightly inclined relative to a straight line perpendicular to the pipe axis as viewed in a transverse section. Each of the intermediate shoulder surfaces of the pin and the box may be a single surface expanding substantially across the entire radial width of the stepped portion.

A first circumferential groove may be provided on one of the first peripheral surface and the second peripheral surface, the first circumferential groove having a curved surface smoothly contiguous to the intermediate shoulder surface associated with the one peripheral surface, the curved surface being at least a portion of an in-groove surface of the first circumferential groove. The first circumferential groove has a radial groove depth. In conventional constructions with no such circumferential groove, the rigidity of portions including and near each of the intermediate shoulder surfaces of the pin and the box is relative high, while the rigidity of each of the pin and the box intermediate critical cross sections located near the intermediate shoulder surfaces is low, such that large strains, exceeding the range of elasticity, may be generated at and near the pin and the box intermediate critical cross sections, which can easily lead to a break. In contrast, in the construction of the present embodiment, a first circumferential groove is provided at a position where the presence of the stepped portion forming an intermediate shoulder surface results in a rapid decrease in the pipe-wall thickness, thereby improving the extensibility associated with tensile loading at this position, thus reducing the amount of strain generated at the pin or box intermediate critical cross section. Further, as the curved surface forming part of the first circumferential groove is smoothly contiguous to the associated intermediate shoulder surface, stress concentration in the first circumferential groove may be mitigated. Further, even if the radius of curvature of the curved surface is relatively large, a certain area of contact between the intermediate shoulder surfaces is ensured as the entirety or some of the curved surface is accommodated in the groove depth. Further, as the radius of curvature of the curved surface is increased, the cutting-tool tip used for the cutting process for the intermediate shoulder surfaces and the various threads may be one with a cutting point having a larger radius of curvature than conventional cutting-tool tips, thereby increasing the amount of axial advance per rotation during lathing. This will improve the life of cutting-tool tips and improving productivity to produce pins and boxes.

A second circumferential groove is provided on the other one of the first peripheral surface and the second peripheral surface, the second circumferential groove having a curved surface smoothly contiguous to the intermediate shoulder surface associated with the other peripheral surface, the curved surface being at least a portion of an in-groove surface of the second circumferential groove. The second circumferential groove has a radial groove depth. As circumferential grooves are provided that are contiguous to the intermediate shoulder surfaces of both the pin and the box, the above-identified advantages can be obtained at both the pin and the box intermediate critical cross sections. The second circumferential groove may have the same cross-sectional shape and size as the first circumferential groove.

Preferably, the first and/or second circumferential groove(s) may be an annular groove extending along the entire circumference of the pin or box. This will further improve productivity.

Preferably, a radius of curvature of the curved surface of the first circumferential groove is equal to a radius of curvature of the curved surface of the second circumferential groove. Thus, a common cutting-tool tip may be used to create the first and second circumferential grooves.

The first circumferential groove may be provided on the first peripheral surface. This will prevent a break at the pin intermediate critical cross section and, at the same time, improve the ability to create the pin intermediate shoulder surface.

In implementations where a first circumferential groove is provided on the pin, the first peripheral surface may further include a threadless portion located between the first circumferential groove and the second male thread and having an axial length. This threadless portion may have an outer peripheral surface with an outer diameter larger than a diameter of that thread root of the second male thread which is adjacent to the threadless portion. In such implementations, the threadless portion ensures rigidity for the pin portions between the first circumferential groove and pin intermediate critical cross section, ensuring resistance against compression loads and/or bending loads.

The first circumferential groove provided on the pin may further include a tapered surface contiguous to that one of ends of the curved surface as determined along the axial direction which is opposite to that associated with the intermediate shoulder surface, the tapered surface being a portion of the in-groove surface of the first circumferential groove, and the curved surface and the outer peripheral surface of the threadless portion can be connected via this tapered surface. In such implementations, the cutting point of the cutting-tool tip may be inserted into the pin along the tapered surface up to that position on the first circumferential groove at which the curved portion is to be formed, and an intermediate shoulder surface can be created immediately after the creation of the curved surface, thereby further improving productivity. In the above-discussed construction, the first peripheral surface includes the outer peripheral surface of the threadless portion as well as the curved surface and tapered surface of the first circumferential groove, and the first circumferential groove is defined by the shape of this first peripheral surface.

The pin includes a pin intermediate critical cross section PICCS (see FIG. 3) located near that one of ends of the second male thread which is closer to the intermediate shoulder surface. Preferably, a cross-sectional area $A_{P1}$ of that transverse section of the pin which contains a bottom of the first circumferential groove provided on the pin is larger than a cross-sectional area $A_{P2}$ of the pin intermediate critical cross section. This will ensure strength for the pin portion provided with the first circumferential groove.

Figure 3:
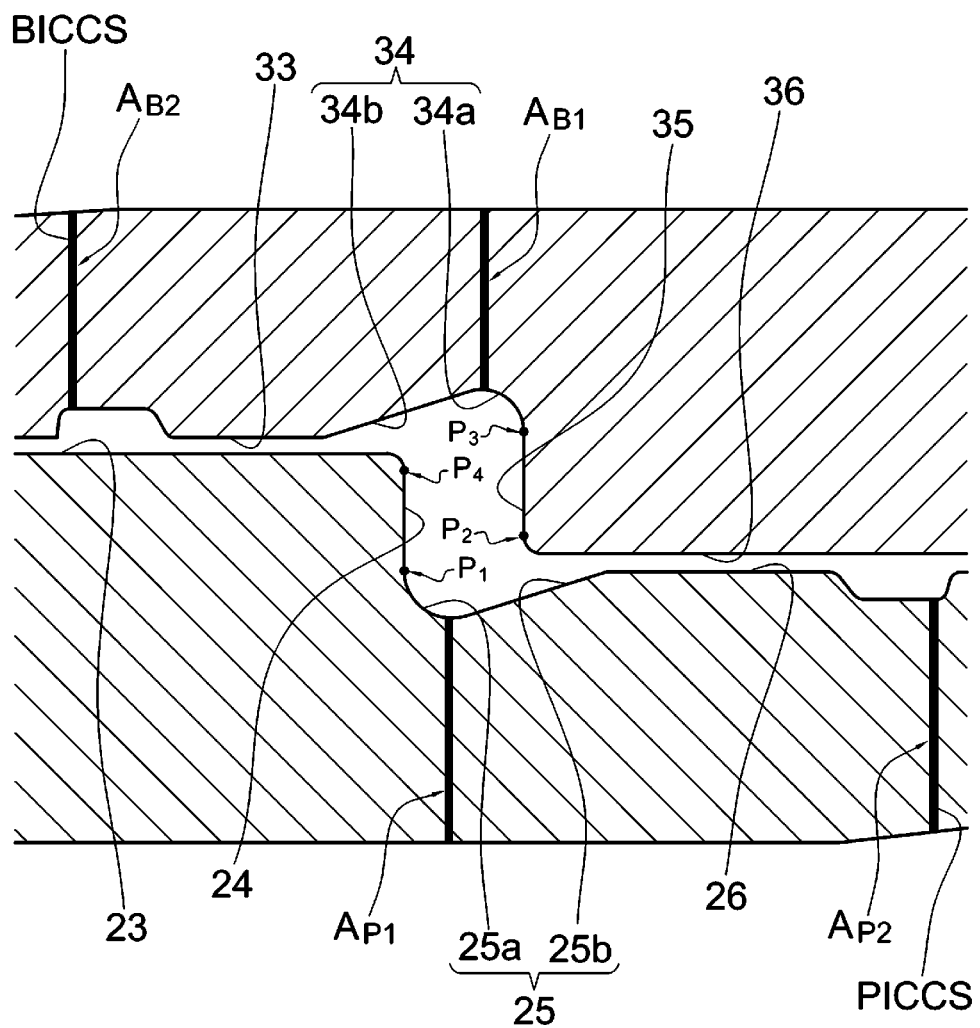
FIG. 3 is a cross-sectional view of the threaded connection, illustrating the profile of the intermediate shoulders and nearby areas of the pin and the box.

Preferably, an edge connecting the curved surface of the first circumferential groove provided on the pin and the intermediate shoulder surface, $P_1$, may be located radially inward of a radially inner edge $P_2$ of the intermediate shoulder surface of the box (see FIG. 3). In such implementations, a large area of contact between the intermediate shoulder surfaces can be ensured even when the radius of curvature of the curved surface is relatively large. The radially inner edge $P_2$ of the intermediate shoulder surface of the box is defined as the inner end of the straight portion of the intermediate shoulder surface as viewed in a longitudinal cross section, excluding the round portions at the corners.

The first circumferential groove may be provided on the second peripheral surface. In such implementations, a break at the box intermediate critical cross section may be prevented and, at the same time, the ability to create the intermediate shoulder surface of the box may be improved.

In implementations where a first circumferential groove is provided on the box, the second peripheral surface may further include a threadless portion located between the first circumferential groove and the first female thread and having a longitudinal length. This threadless portion may have an inner peripheral surface with an inner diameter smaller than a diameter of that thread root of the first female thread which is adjacent to the threadless portion. In such implementations, the threadless portion ensures rigidity for the box portions between the first circumferential groove and box intermediate critical cross section, thereby ensuring resistance against compression loads and bending loads.

The first circumferential groove provided on the box may further include a tapered surface contiguous to that one of ends of the curved surface as determined along the axial direction which is opposite to that associated with the intermediate shoulder surface, the tapered surface being a portion of the in-groove surface of the first circumferential groove, and the curved surface and the inner peripheral surface of the threadless portion can be connected via this tapered surface. In such implementations, the cutting point of the cutting-tool tip may be inserted into the box along the tapered surface up to that position on the first circumferential groove at which the curved surface is to be formed, and an intermediate shoulder surface can be created immediately after the creation of the curved surface, thereby further improving productivity. In the above-discussed construction, the first peripheral surface includes the inner peripheral surface of the threadless portion as well as the curved surface and tapered surface of the first circumferential groove, and the first circumferential groove is defined by the shape of this first peripheral surface.

The box includes a box intermediate critical cross section (see FIG. 3) located near that one of ends of the first female thread which is closer to the intermediate shoulder surface. Preferably, a cross-sectional area $A_{B1}$ of that transverse section of the box which contains a bottom of the first circumferential groove provided on the box is larger than a cross-sectional area $A_{B2}$ of the box intermediate critical cross section BICCS. This will ensure strength for the box portions provided with the first circumferential groove.

Preferably, an edge connecting the curved surface of the first circumferential groove provided on the box and the intermediate shoulder surface, $P_3$, may be located radially outward of a radially outer edge $P_4$ of the intermediate shoulder surface of the pin (see FIG. 3). In such implementations, a large area of contact between the intermediate shoulder surfaces can be ensured even when the radius of curvature of the curved surface is relatively large. The radially outer edge $P_3$ of the intermediate shoulder surface of the pin is defined as the outer end of the straight portion of the intermediate shoulder surface as viewed in a longitudinal cross section, excluding the round portions at the corners.

The threaded connection according to the present embodiment may be suitably implemented as a semi-flush-type threaded connection with a box having a maximum outer diameter smaller than 108% of the pipe diameter of a steel pipe including a pin, and particularly suitably implemented as an integral semi-flush threaded connection with a box provided on an end of another steel pipe.

In the context of the present disclosure, the various critical cross sections do not include cross sections of threads, and the cross-sectional area of each critical cross section is defined as the area of a cross section that excludes any thread, regardless of whether in a perfect-thread portion or imperfect-thread portion, of a tapered thread screw.

[Construction of Threaded Connection for Oil-Well Pipe]

Referring to FIG. 1, a threaded connection for oil-well pipe according to the present embodiment, denoted as 1, is an integral threaded connection including a tubular pin 2 and a tubular box 3 adapted to be made up on the pin 2 as the pin 2 is screwed therein. The pin 2 is provided on an end of one of a pair of oil-well pipes to be connected together, while the box 3 is provided on an end of the other oil-well pipe. To maximize the pipe-wall thickness of each of the pin 2 and box 3 in an arrangement where a pin 2 provided on an end of one oil-well pipe is fitted into the interior of a box 3 provided on an end of the other oil-well pipe, the pin 2 and box 3 are formed by processing the end of the oil-well pipe provided with the pin 2 to have a reduced diameter and processing the end of the oil-well pipe provided with the box 3 to have an increased diameter, and then machining each pipe end having a reduced or increased diameter.

The pin 2 extends from an end of the pipe body of the one oil-well pipe along the axis of the pipe, where the direction of the extension (i.e. direction to the right in FIG. 1) may also be referred to as direction of the outer end of the pin. On the outer periphery of the pin 2 are provided, starting from the pipe body toward the outer end, a pin outer sealing surface 21, a first male thread 22 constituted by a tapered thread screw, a threadless portion 23 having an outer peripheral surface contiguous to the thread root of the first male thread 22, a stepped portion including an intermediate torque shoulder surface 24, a circumferential groove 25, a threadless portion 26 having an outer peripheral surface contiguous to the thread crest of a second male thread 27, the second male thread 27 constituted by a tapered thread screw with a smaller diameter than the first male thread 22, and a pin inner sealing surface 28. The circumferential groove 25 is provided on the outer peripheral surface of the pin, located between the intermediate shoulder surface 24 and second male thread 27.

The box 3 extends from an end of the pipe body of the other oil-well pipe along the axis of the pipe, where the direction of the extension (i.e. direction to the left in FIG. 1) may also be referred to as direction of the outer end of the box. On the outer periphery of the box 3 are provided, starting from the outer end toward the pipe body, a box outer sealing surface 31, a first female thread 32 constituted by a tapered thread screw, a threadless portion 33 having an inner peripheral surface contiguous to the thread crest of the first male thread 32, a circumferential groove 34, a stepped portion including an intermediate torque shoulder 35, a threadless portion 36 contiguous to the thread root of a second female thread 37, the second female thread 37 constituted by a tapered thread screw with a smaller diameter than the first female thread 32, and a box inner sealing surface 38. The circumferential groove 34 is provided on the inner peripheral surface of the box 3, located between the intermediate shoulder surface 35 and first female thread 32.

As shown in FIG. 1, the threaded connection 1 with a two-step thread construction of the present embodiment has a pin critical cross section PCCS located near that end of the region of engagement between the first male and female threads 22 and 32 which is closer to the pin pipe body, and a box critical cross section BCCS located near that end of the region of engagement between the second male and female threads 27 and 37 which is closer to the box pipe body. Further, the connection has a box intermediate critical cross section BICCS located near that end of the region of engagement between the first male and female threads 22 and 32 which is closer to the intermediate shoulder surface, and a pin intermediate critical cross section PICCS located near that end of the region of engagement between the second male and female threads 27 and 37 which is closer to the intermediate shoulder surface.

When the pin 2 and box 3 are made up, the pin outer sealing surface 21 and box outer sealing surface 31 are in contact along the entire circumference to form a metal-to-metal seal, the first male thread 22 engages the first female thread 32, the intermediate shoulder surfaces 24 and 35 are in contact to bear make-up torque, the second male thread 27 engages the second female thread 37, and the pin inner sealing surface 28 is in contact with the box inner sealing surface 38 along the entire circumference to form a metal-to-metal seal.

When the connection is made up, the threadless portion 23 of the pin 2 has been inserted into the threadless portion 33 of the box 3, and the threadless portion 26 of the pin 2 has been inserted into the threadless portion 36 of the box 3. A clearance is formed between the threadless portions 22 and 33, and a clearance is formed between the threadless portions 26 and 36.

Each of the circumferential grooves 25 and 34 is constituted by an annular groove that is continual along the entire circumference. The circumferential groove 25 of the pin 2 includes a curved surface 25a smoothly contiguous to the intermediate shoulder surface of the pin 2 and having a constant radius of curvature, and a tapered surface 25b contiguous to that one of the ends of the curved surface 25a as determined along the axial direction which is opposite to the end associated with the intermediate shoulder surface 24, the curved surface and tapered surface forming the in-groove surface of the circumferential groove. The tapered surface 25b connects the curved surface 25a with the outer peripheral surface of the threadless portion 26. The circumferential groove 34 of the box 3 includes a curved surface 34a smoothly contiguous to the intermediate shoulder surface 35 of the box 3 and having a constant radius of curvature, and a tapered surface 34b contiguous to that one of the ends of the curved surface 34a as determined along the axial direction which is opposite to the end associated with the intermediate shoulder surface 35, the curved surface and tapered surface forming the in-groove surface of the circumferential groove. The tapered surface 34b connects the curved surface 34a with the inner peripheral surface of the threadless portion 33.

The groove depth of the circumferential groove 25, i.e. its depth relative to the outer peripheral surface of the threadless portion 26, may be substantially equal to the root depth near that one of the ends of the second male thread 27 which is located inward as determined along the axial direction (i.e. closer to the intermediate shoulder surface). Referring to FIG. 3, the area of a transverse section of the pin 2 containing the bottom of the peripheral groove 25, referred to as cross-sectional area $A_{P1}$, is preferably larger than the area of the pin intermediate critical cross section PICCS, referred to as cross-sectional area $A_{P2}$. Further, to allow the circumferential groove 25 to sufficiently exhibit its effects, the groove depth may be preferably such that the cross-sectional area $A_{P1}$ is smaller than 110% of the cross-sectional area $A_{P2}$. More preferably, the groove depth of the circumferential groove 25 may be such that the cross-sectional area $A_{P1}$ is smaller than 105% of the cross-sectional area $A_{P2}$.

The groove depth of the circumferential groove 34, i.e. its depth relative to the inner peripheral surface of the threadless portion 33, may be substantially equal to the root depth near that one of the ends of the first female thread 32 which is located inward as determined along the axial direction (i.e. closer to the intermediate shoulder surface). Referring to FIG. 3, the area of a transverse section of the box 3 containing the bottom of the peripheral groove 34, referred to as cross-sectional area $A_{B1}$, is preferably larger than the area of the box intermediate critical cross section BICCS, referred to as cross-sectional area $A_{B2}$. Further, to allow the circumferential groove 34 to sufficiently exhibit its effects, the groove depth may be preferably such that the cross-sectional area $A_{B1}$ is smaller than 110% of the cross-sectional area $A_{B2}$. More preferably, the groove depth of the circumferential groove 34 may be such that the cross-sectional area $A_{B1}$ is smaller than 105% of the cross-sectional area $A_{B2}$.

In the shown embodiment, each of the intermediate shoulder surfaces 24 and 35 is constituted by a flat surface perpendicular to the pipe axis. As shown in detail in FIG. 3, the radially inner edge $P_1$ of the intermediate shoulder surface 24 of the pin 2 is generally at the same radial position as the outer peripheral surface of the threadless portion 26, and the radially outer edge $P_4$ of the intermediate shoulder surface 24 is generally at the same radial position as the outer peripheral surface of the threadless portion 23. The radially inner edge $P_2$ of the intermediate shoulder surface 35 of the box 3 is generally at the same radial position as the inner peripheral surface of the threadless portion 36, and the radially outer edge $P_3$ of the intermediate shoulder surface 35 is generally at the same radial position as the inner peripheral surface of the threadless portion 33. The inner edge of the intermediate shoulder surface 24 of the pin 2, i.e. edge connecting the intermediate shoulder surface 24 and the curved surface 25a of the peripheral groove 25, denoted by $P_1$, is located radially inward of the radially inner edge $P_2$ of the box intermediate shoulder 35. The outer edge of the intermediate shoulder surface 35 of the box 3, i.e. edge connecting the intermediate shoulder surface 35 and the curved surface 34a of the circumferential groove 34, denoted by $P_3$, is located radially outward of the radially outer edge of the pin intermediate shoulder surface 24, denoted by $P_4$. As the curved surfaces 25a and 34a connect to the intermediate shoulder surfaces 24 and 35, the radii of curvature of the curved surfaces 25a and 34a may be increased without reducing the area of contact between the intermediate shoulder surfaces 24 and 35.

[Process Method for Creating Circumferential Groove]

Figure 4:
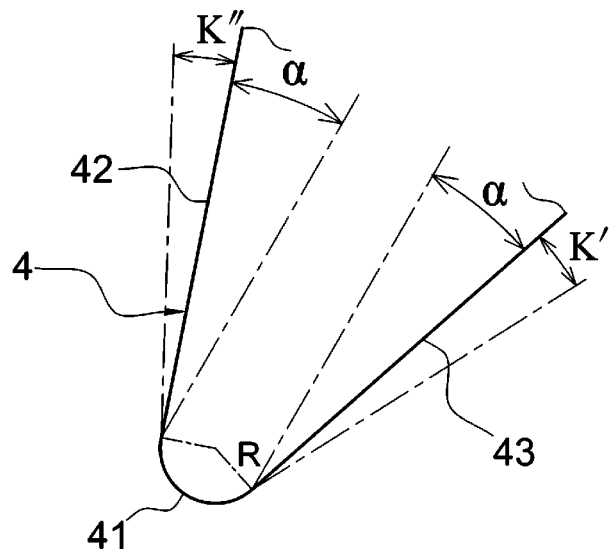
FIG. 4 is a side view of a cutting part of a cutting-tool tip for creating an intermediate shoulder surface.

FIG. 4 is an enlarged side view of a pointed cutting part 4 of the cutting-tool tip (thread-cutting insert) for machining to create the threads 22, 27, 32 and 37 and circumferential grooves 25 and 34. The cutting part 4 has a round point 41 having a predetermined radius of curvature R and left and right side edges 42 and 43. The left and right side edges 42 and 43 are each positioned at a cutting-insert angle α so as to gradually widen as it goes away from the round point 41.

Figure 5:
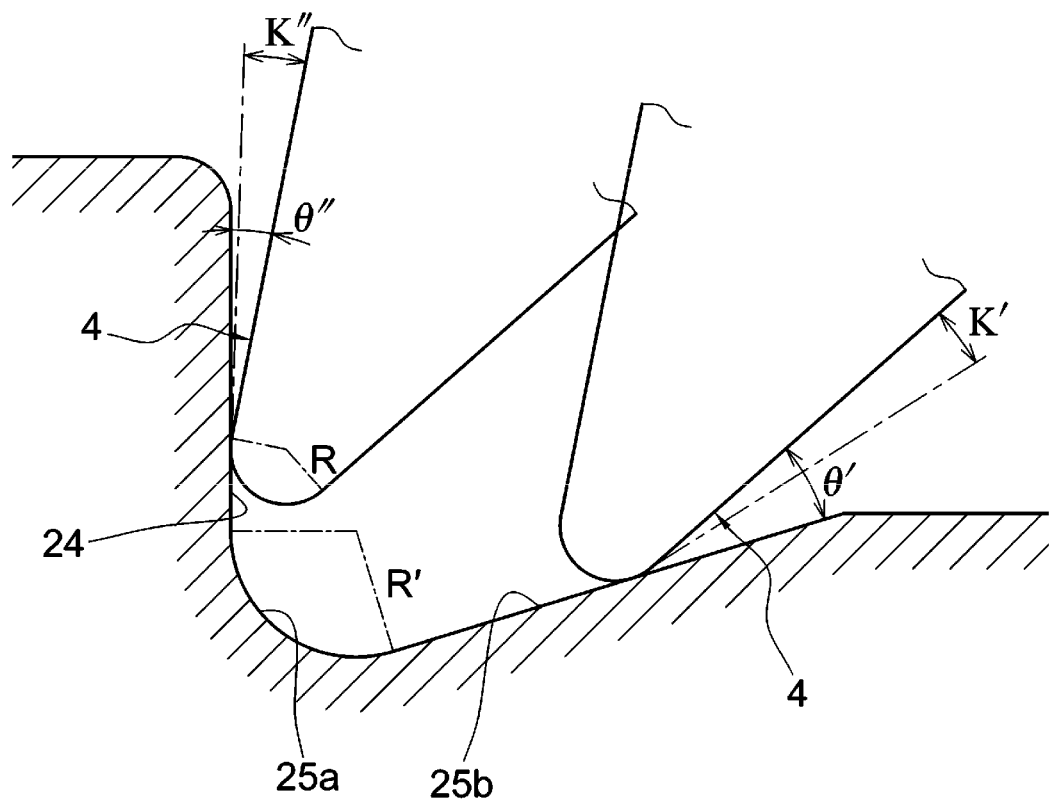
FIG. 5 shows the process for creating an intermediate shoulder surface.

The cutting part 4 has clearance angles K' and K" relative to the worked surface that are necessary during machining. That is, as shown in FIG. 5, machining is impossible unless the angles θ' and θ" between the left and right side edges 42 and 43 and the worked surface are larger than the clearance angles K' and K". Thus, during machining to create the pin intermediate shoulder surface 24 and circumferential groove 25, the cutting part 4 may be inserted into the workpiece at an angle that satisfies the relationship θ'>K' and the relationship θ">K", as shown in FIG. 5, to allow consecutive machining to create the circumferential groove 25 and intermediate shoulder surface 24. Further, since the circumferential groove 25 includes the tapered surface 25b, it is possible to insert the cutting part 4 while maintaining the clearance angle K'. Further, in view of the necessity to use a rounded point 41 with a radius of curvature R smaller than the radius of curvature of the curved surface 25a to be created, the circumferential groove 25 of the present disclosure has a depth that makes it possible to provide a relatively large radius of curvature R' for the curved surface 25a without sacrificing the area of contact between the intermediate shoulder surfaces, which allows the use of a cutting-tool tip with a round point 41 having a large radius of curvature R. The same applies to the process for the circumferential groove 34 and box intermediate shoulder surface 35.

The present disclosure is not only applicable to integral threaded connections, but also to coupling-type ones. Further, each of the threads may be a trapezoidal thread, an API round edge, an API buttress thread, or a wedge thread. Otherwise, the present disclosure is not limited to the above-illustrated embodiment, and various modifications are possible without departing from the spirit of the present disclosure.

EXAMPLES

To verify the effects of the threaded connection for steel pipe according to the present embodiment, numerical analysis simulations were performed using the elasto-plastic finite element method.

<Test Conditions>

Figure 2:
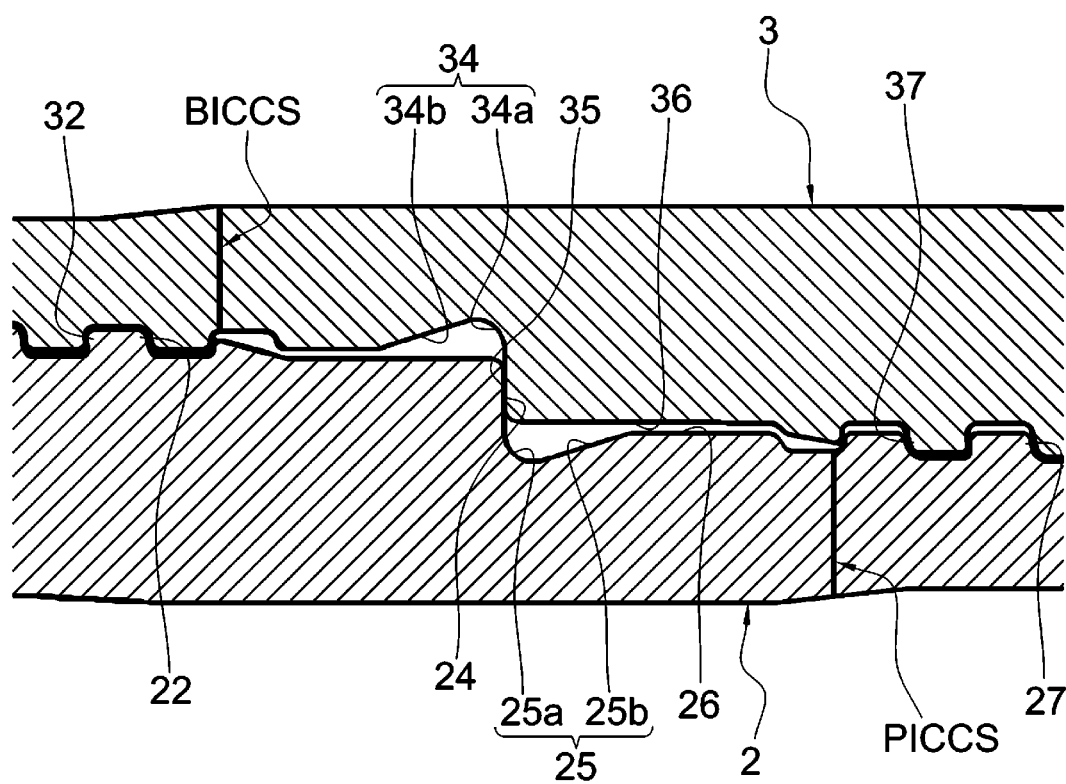
FIG. 2 is an enlarged longitudinal cross-sectional view of main portions of the threaded connection for steel pipe.

Specimens (analysis models) of the integral threaded connection for oil-well pipe shown in FIGS. 1 to 3, of two (large and small) pipe diameters, were created, where specimens #2 and #4 had the circumferential grooves 25 and 34 and specimens #1 and #3 had none of the circumferential grooves, and elasto-plastic finite element analysis was performed on each of the specimens and a comparison was made between the different values of the equivalent plastic strain generated in the thread root of the second male thread including the pin intermediate critical cross section and the equivalent plastic strain generated in the thread root of the first female thread including the box intermediate critical cross section.

<Size of Oil-Well Pipes>

The oil-well pipes of specimens #1 and #2 had a size described as 9⅝" 47.0 #(outer diameter of pipe body: 244.48 mm; inner diameter of pipe body: 220.50 mm), and a joint efficiency (i.e. ratio of the area of the box critical cross section BCCS to the cross-sectional area of the pipe body) of 67.3%.

The oil-well pipes of specimens #3 and #4 had a size described as 13⅜" 72.0 #(outer diameter of pipe body: 339.73 mm; inner diameter of pipe body: 313.60 mm), and a joint efficiency of 70.5%.

For each specimen, each thread had a unified size described as a thread taper angle of 1.591°, a thread height of 1.3 mm and a thread pitch of 5.08 mm.

Further, each of the circumferential grooves 25 and 34 of each specimen had a unified shape, where the radius of the curvature of curved surface 25*a*, 34*a* was 1.7 mm, the groove depth was 1.2 mm and the angle between the taper generatrix of the tapered surface 25*b*, 34*b* and the pipe axis was 15°.

<Material of Oil-Well Pipes>

Oil-well pipe material Q125 in accordance with the API standards (nominal yield stress YS=862 MPa (125 ksi))

<Evaluation Method>

First, each specimen, as made up, was simulated and analysed, before repeated complex loads simulating the Series A tests defined in API 5C5:2017 CAL IV were applied to the made-up models, and the values, for the various specimens, of the equivalent plastic strain directly after application of simple tensile loading at an earlier stage of the complex loading and the equivalent plastic strain after completion of the entire process of repeated complex loading were compared.

<Evaluation Results>

Figure 6A:
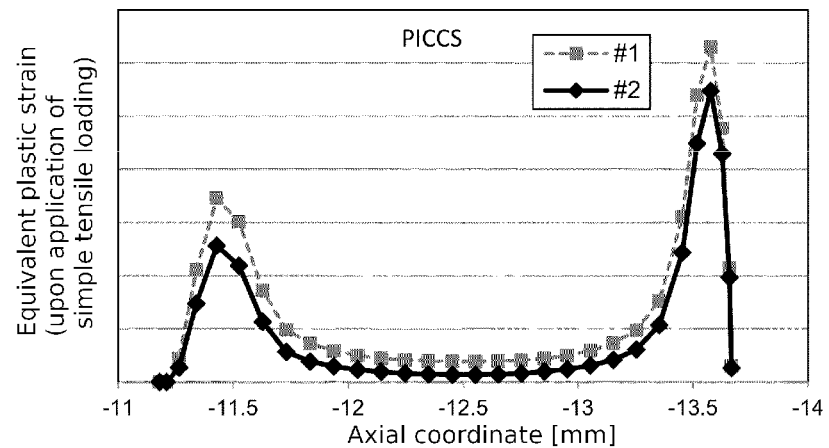
FIG. 6A is a graph showing the equivalent plastic strain generated at and near the pin intermediate critical cross section when simple tensile loading is applied to each of specimens #1 and #2.
Figure 6B:
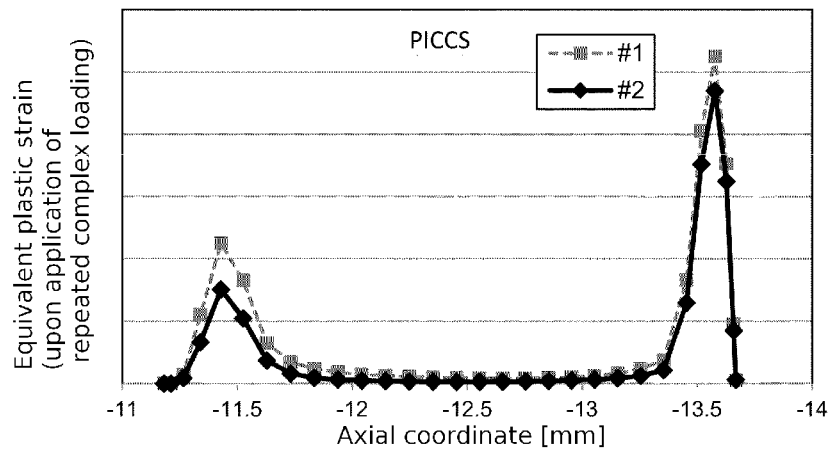
FIG. 6B is a graph showing the equivalent plastic strain generated at and near the pin intermediate critical cross section when repeated loading is applied to each of specimens #1 and #2.
Figure 6C:
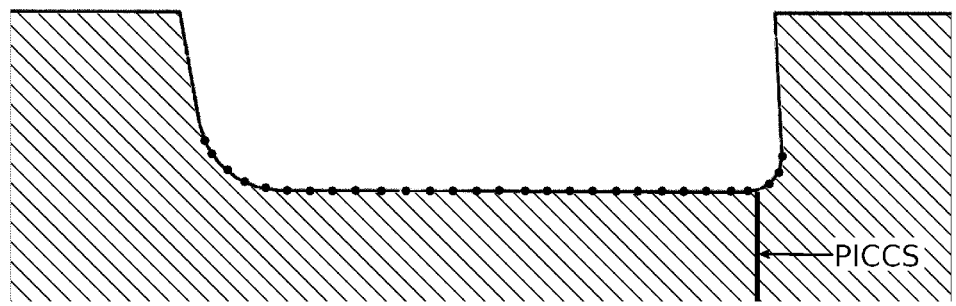
FIG. 6C is a cross-sectional view of the thread root of the second male thread at and near the pin intermediate critical cross section, showing the positions of strain measurement for the various points on the horizontal axes of the graphs of FIGS. 6A and 6B.
Figure 7A:
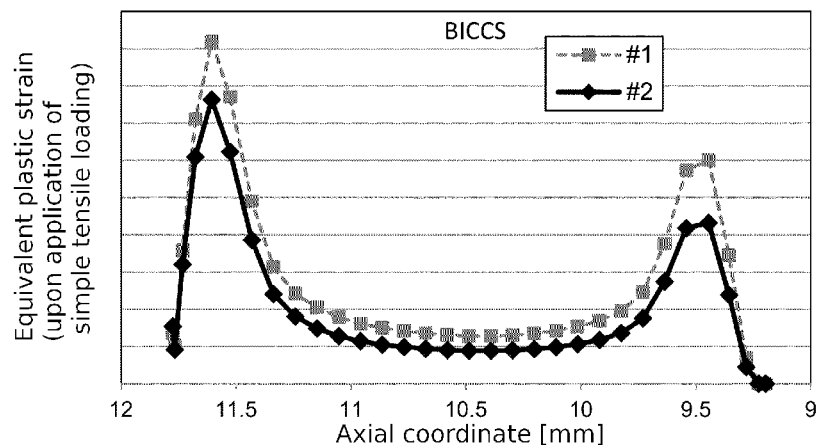
FIG. 7A is a graph showing the equivalent plastic strain generated at and near the box intermediate critical cross section when simple tensile loading is applied to each of specimens #1 and #2.
Figure 7B:
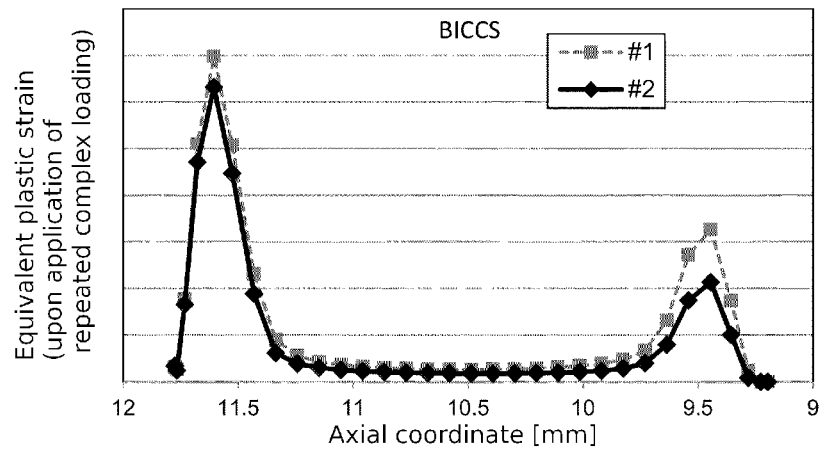
FIG. 7B is a graph showing the equivalent plastic strain generated at and near the box intermediate critical cross section when repeated loading is applied to each of specimens #1 and #2.
Figure 7C:
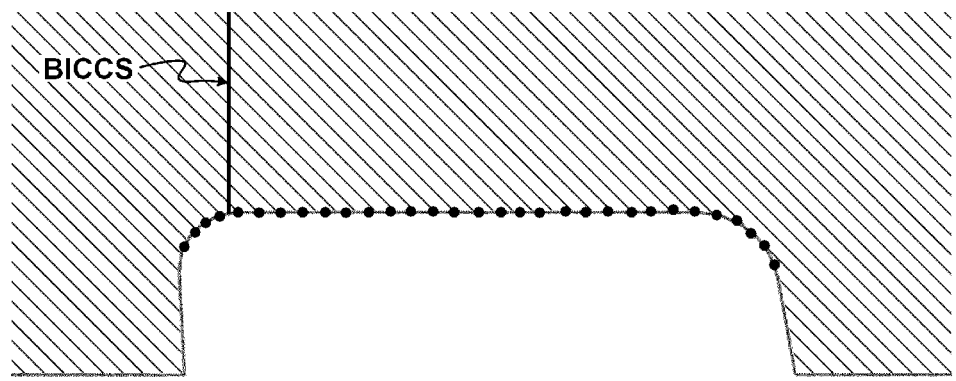
FIG. 7C is a cross-sectional view of the thread root of the first female thread at and near the box intermediate critical cross section, showing the positions of strain measurement for the various points on the horizontal axes of the graphs of FIGS. 7A and 7B.
Figure 8A:
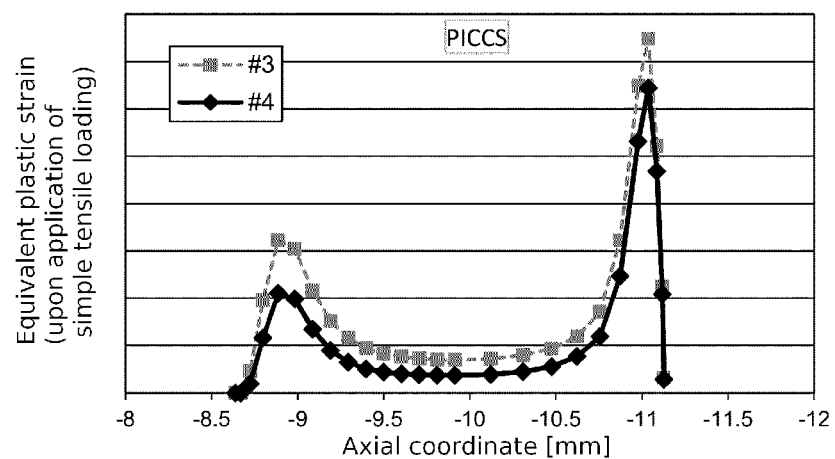
FIG. 8A is a graph showing the equivalent plastic strain generated at and near the pin intermediate critical cross section when simple tensile loading is applied to each of specimens #3 and #4.
Figure 8B:
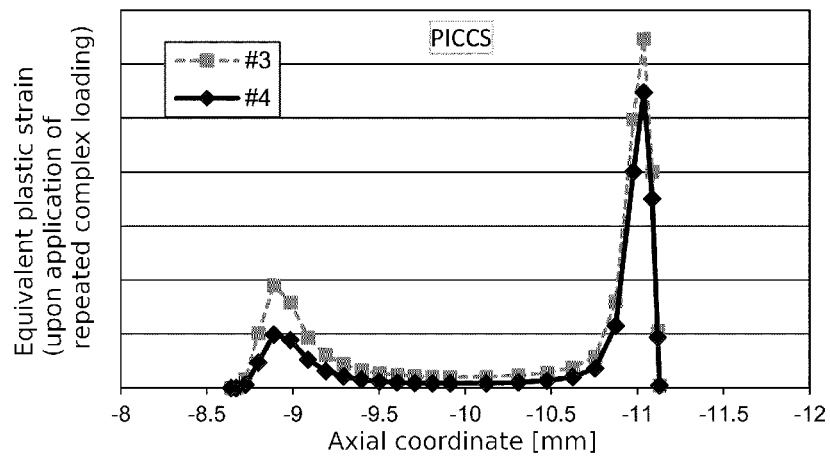
FIG. 8B is a graph showing the equivalent plastic strain generated at and near the pin intermediate critical cross section when repeated loading is applied to each of specimens #3 and #4.
Figure 9A:
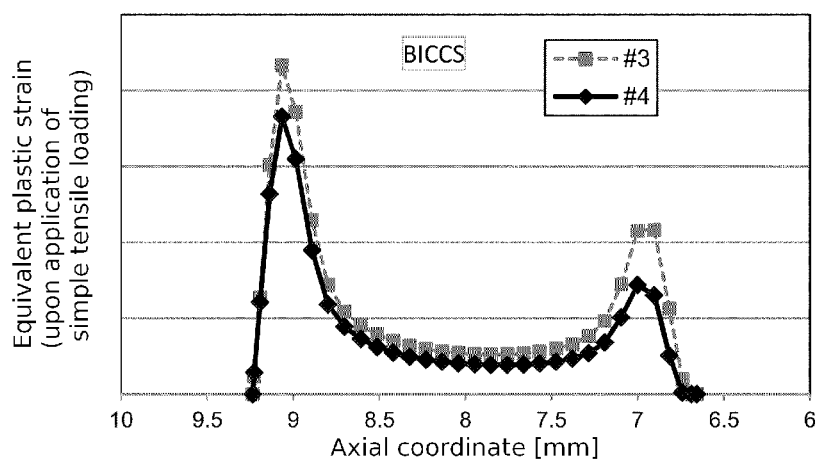
FIG. 9A is a graph showing the equivalent plastic strain generated at and near the box intermediate critical cross section when simple tensile loading is applied to each of specimens #3 and #4.
Figure 9B:
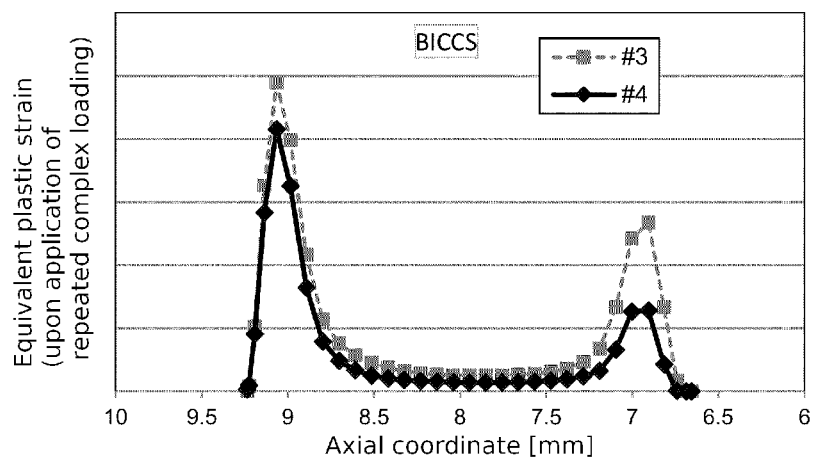
FIG. 9B is a graph showing the equivalent plastic strain generated at and near the box intermediate critical cross section when repeated loading is applied to each of specimens #3 and #4.

The results of comparisons between small-diameter specimens #1 and #2 are shown in the graphs of FIGS. 6A, 6B, 7A and 7B. FIG. 6A shows the equivalent plastic strain distribution at and near the pin intermediate critical cross section directly after application of simple tensile loading; FIG. 6B shows the equivalent plastic strain distribution at and near the pin intermediate critical cross section after completion of the entire process of repeated complex loading; FIG. 7A shows the equivalent plastic strain distribution at and near the box intermediate critical cross section directly after application of simple tensile loading; and FIG. 7B shows the equivalent plastic strain distribution at and near the box intermediate critical cross section after completion of the entire process of repeated complex loading. The horizontal axis, labeled "axial coordinate", indicates the distance from the intermediate shoulder surface as measured in the pipe-axis direction, where a positive value means a distance from the intermediate shoulder surface in the direction toward the pipe body of the pin, and a negative value means a distance from the intermediate shoulder surface in the direction toward the tip of the pin. The points at which equivalent plastic strain was measured are indicated by the dots in FIGS. 6C and 7C.

As will be apparent from these graphs, it was verified that the equivalent plastic strain was lower in specimen #2 including the circumferential grooves 25 and 34 than in specimen #1 with no circumferential groove, across the entire range at and near the pin intermediate critical cross section and at and near the box intermediate critical cross section. In the graphs of FIGS. 6A and 6B, the right peak is for the round portion at the bottom of the load flank of the second male thread 27, while the left peak is for the round portion at the bottom of the stab flank.

The differences between specimens #1 and #2 are more significant directly after application of simple tensile loading than after completion of the entire process, presumably because plastic strains at the various positions were accumulated as complex loads were repeated.

Similarly, the results of comparisons between large-diameter specimens #3 and #4 are shown in the graphs of FIGS. 8A, 8B, 9A and 9B. As will be apparent from these graphs, the large-diameter specimens showed similar tendencies to those for the small-diameter specimens, verifying that providing circumferential grooves reduced plastic strains generated in the thread root at and near the intermediate critical cross sections, regardless of pipe diameter.

EXPLANATION OF CHARACTERS

1: threaded connection
2: pin; 22: first male thread; 24: intermediate shoulder surface
25: circumferential groove; 25*a*: curved surface; 25*b*: tapered surface
26: threadless portion; 27: second male thread
3: box; 32: first female thread; 33: threadless portion
34: circumferential groove; 34*a*: curved surface; 34*b*: tapered surface
35: intermediate shoulder surface; 37: second female thread
PICCS: pin intermediate critical cross section; BICCS: box intermediate critical cross section

The invention claimed is:

1. A threaded connection comprising a tubular pin and a tubular box, the pin and the box being made up as the pin is screwed into the box, wherein, on an outer periphery of the pin are provided: a first male thread; a second male thread spaced apart from the first male thread and located further toward a tip as determined along an axial direction, the second male thread having a smaller diameter than the first male thread; an intermediate shoulder surface constituted by a stepped portion located between the first male thread and the second male thread; and a first peripheral surface constituted by an outer periphery portion of the pin located between the intermediate shoulder surface and the second male thread, on an inner periphery of the box are provided: a first female thread engaged by the first male thread when the connection is made up; a second female thread engaged by the second male thread when the connection is made up; an intermediate shoulder surface constituted by a stepped portion located between the first female thread and the second female thread, the intermediate shoulder surface being in contact with the intermediate shoulder surface of the pin when the connection is made up; and a second peripheral surface constituted by an inner periphery portion of the box located between the intermediate shoulder surface and the first female thread, a first circumferential groove is provided on the first peripheral surface, the first circumferential groove having a curved surface smoothly contiguous to the associated intermediate shoulder surface, the curved surface being at least a portion of an in-groove surface of the first circumferential groove, wherein the first peripheral surface further includes a threadless portion located between the first circumferential groove and the second male thread and having an axial length, the threadless portion having an outer peripheral surface with an outer diameter larger than a diameter of that thread root of the second male thread which is adjacent to the threadless portion, and the first circumferential groove further includes a tapered surface contiguous to that one of ends of the curved surface as determined along the axial direction which is opposite to that associated with the intermediate shoulder surface, the tapered surface being a portion of the in-groove surface of the first circumferential groove, and the curved surface and the outer peripheral surface of the threadless portion are connected via this tapered surface.

2. The threaded connection according to claim 1, wherein a second circumferential groove is provided on the second peripheral surface, the second circumferential groove having a curved surface smoothly contiguous to the associated intermediate shoulder surface, the curved surface being at least a portion of an in-groove surface of the second circumferential groove.

3. The threaded connection according to claim 2, wherein a radius of curvature of the curved surface of the first circumferential groove is equal to a radius of curvature of the curved surface of the second circumferential groove.

4. The threaded connection according to claim 1, wherein the pin includes a pin intermediate critical cross section located near that one of ends of the second male thread which is closer to the intermediate shoulder surface, and a cross-sectional area of that transverse section of the pin which contains a bottom of the first circumferential groove is larger than a cross-sectional area of the pin intermediate critical cross section.

5. The threaded connection according to claim 1, wherein an edge connecting the curved surface of the first circumferential groove and the intermediate shoulder surface is located radially inward of a radially inner edge of the intermediate shoulder surface of the box.

6. A threaded connection comprising a tubular pin and a tubular box, the pin and the box being made up as the pin is screwed into the box, wherein, on an outer periphery of the pin are provided: a first male thread; a second male thread spaced apart from the first male thread and located further toward a tip as determined along an axial direction, the second male thread having a smaller diameter than the first male thread; an intermediate shoulder surface constituted by a stepped portion located between the first male thread and the second male thread; and a first peripheral surface constituted by an outer periphery portion of the pin located between the intermediate shoulder surface and the second male thread, on an inner periphery of the box are provided: a first female thread engaged by the first male thread when the connection is made up; a second female thread engaged by the second male thread when the connection is made up; an intermediate shoulder surface constituted by a stepped portion located between the first female thread and the second female thread, the intermediate shoulder surface being in contact with the intermediate shoulder surface of the pin when the connection is made up; and a second peripheral surface constituted by an inner periphery portion of the box located between the intermediate shoulder surface and the first female thread, a first circumferential groove is provided on the second peripheral surface, the first circumferential groove having a curved surface smoothly contiguous to the associated intermediate shoulder surface, the curved surface being at least a portion of an in-groove surface of the first circumferential groove, wherein the second peripheral surface further includes a threadless portion located between the first circumferential groove and the first female thread and having a longitudinal length, the threadless portion having an inner peripheral surface with an inner diameter smaller than a diameter of that thread root of the first female thread which is adjacent to the threadless portion, and the first circumferential groove further includes a tapered surface contiguous to that one of ends of the curved surface as determined along the axial direction which is opposite to that associated with the intermediate shoulder surface, the tapered surface being a portion of the in-groove surface of the first circumferential groove, and the curved surface and the inner peripheral surface of the threadless portion are connected via this tapered surface.

7. The threaded connection according to claim 6, wherein the box includes a box intermediate critical cross section located near that one of ends of the first female thread which is closer to the intermediate shoulder surface, and a cross-sectional area of that transverse section of the box which contains a bottom of the first circumferential groove is larger than a cross-sectional area of the box intermediate critical cross section.

8. The threaded connection according to claim 6, wherein an edge connecting the curved surface and the intermediate shoulder surface of the first circumferential groove is located radially outward of a radially outer edge of the intermediate shoulder surface of the pin.

9. The threaded connection according to claim 6, wherein a second circumferential groove is provided on the first peripheral surface, the second circumferential groove having a curved surface smoothly contiguous to the associated intermediate shoulder surface, the curved surface being at least a portion of an in-groove surface of the second circumferential groove.

10. The threaded connection according to claim 9, wherein a radius of curvature of the curved surface of the first circumferential groove is equal to a radius of curvature of the curved surface of the second circumferential groove.

* * * * *